Feb. 5, 1952          E. J. KARSCH          2,584,883
ACCESSORY FOR AUTOMOTIVE VEHICLES
Filed March 26, 1948          2 SHEETS—SHEET 1
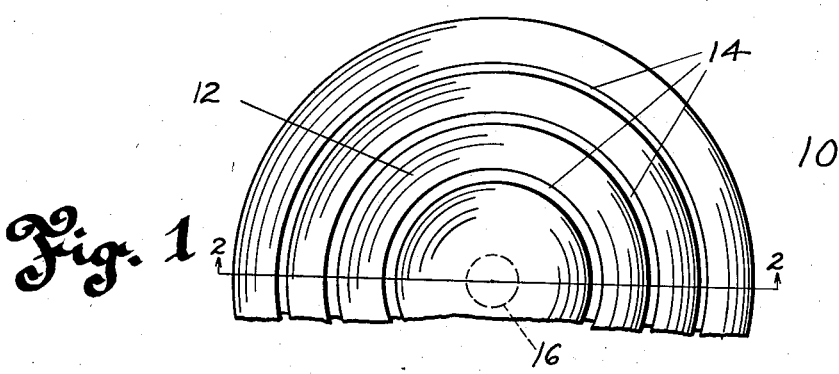
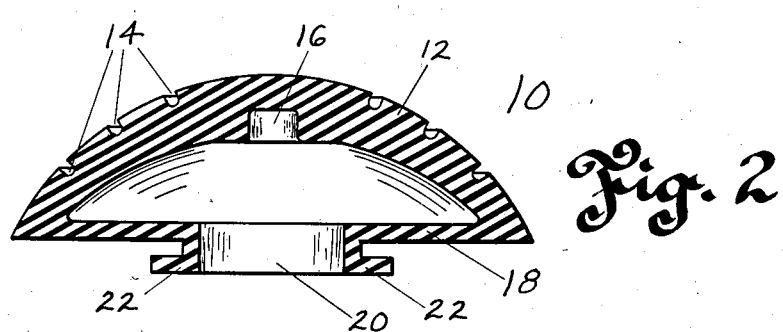
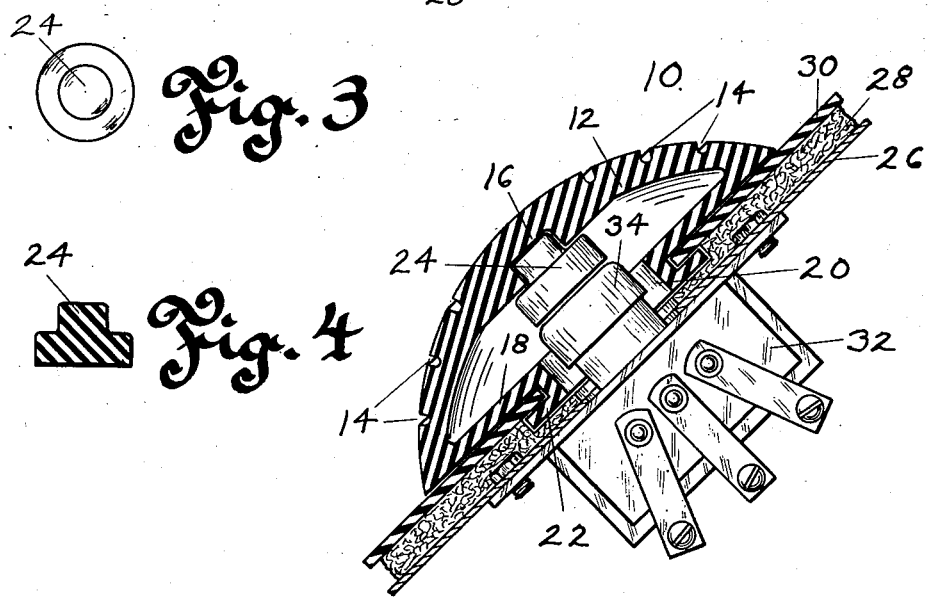
INVENTOR
Eugene J. Karsch
BY Rey Eilers
ATTORNEY Feb. 5, 1952          E. J. KARSCH          2,584,883
ACCESSORY FOR AUTOMOTIVE VEHICLES
Filed March 26, 1948          2 SHEETS—SHEET 2

INVENTOR
Eugene J. Karsch
BY
Ray Eilers
ATTORNEY

Patented Feb. 5, 1952

2,584,883

UNITED STATES PATENT OFFICE 2,584,883

ACCESSORY FOR AUTOMOTIVE VEHICLES

Eugene J. Karsch, Sparta, Ill.

Application March 26, 1948, Serial No. 17,325

9 Claims. (Cl. 200—168)

This invention relates to improvements in accessories for automotive vehicles. More particularly, this invention relates to an improved pressure-applying member than can be used with the headlight dimmer switch of an automotive vehicle.

It is therefore an object of the present invention to provide an improved pressure-applying member that can be used with the headlight dimmer switches of automotive vehicles.

It is customary in present day automotive vehicles to provide a foot-operated switch, on the floor board of the vehicle, which can be actuated to provide alternate energization of the filaments that are in the headlights of the vehicle and that provide light beams which are variously referred to as bright and dim, high and low, and driving and passing beams. Positioning the switch on the slanting section of the floor board of the vehicle is desirable because it permits the driver to keep both hands on the steering wheel of the vehicle while causing alternate energization of the filaments in the headlights of the vehicle; but such positioning of the switch requires the operator of the vehicle to grope for the switch with his foot in an unlighted area of the vehicle. At night, that area can be very dark indeed. Heretofore it has been customary, in an effort to minimize such groping, to cause the upper end of the switch to project up an appreciable distance above the floor board of the vehicle and to place that upper end of the switch where the operator's foot would normally be rested. While such positioning and arranging of the switch minimizes groping by the operator, it interferes with the comfort of the operator; because the operator's foot cannot be comfortable when held away from the floor board by the small-diameter upper end of the switch. Moreover, where the operator's shoes are narrow and have thin soles, as is usually the case with women, the pressure required to depress the small diameter upper ends of the switches is transmitted without diminution or distribution to the operator's foot; thus forcing that foot to withstand a highly concentrated pressure. This pressure causes undue tiring of the operator's foot and leads to undue discomfort. The present invention obviates such discomfort by providing a large-diameter pressure-applying member that increases the area over which the force is applied and that cushions that force without interfering with the operation of the switch. Such a pressure-applying member also encourages the operator to keep his foot on the dimmer switch at all times, thus avoiding the time normally lost in groping for that switch. It is therefore an object of the present invention to provide a large-diameter pressure-applying member that can support the operator's foot and can transmit force to the switch which alternately energizes the filaments of the headlights of the vehicle.

The upper ends of the switches, that alternately energize the filaments in the headlights of automotive vehicles are usually flat and are made of metal. As a result, those upper ends tend to become slippery with wear; and the operator's foot can easily slip off of those switches at a critical moment. This is objectionable because it may cause the operator to look down at his feet when his attention is required for driving, and it may permit the bright lights to confuse the operator of an oncoming vehicle; thus endangering the lives and limbs of the occupants of both vehicles. The present invention obviates any such difficulty by providing a large-diameter pressure-applying member that will not tend to become slippery with wear. It is therefore an object of the present invention to provide a large-diameter pressure-applying member that will not tend to become slippery with wear.

The switches that alternately energize the filaments in the headlights of automotive vehicles customarily extend upwardly through openings in the rubber or carpet covering of the floor boards. Those openings ordinarily are objectionable because they permit grit and dirt to find their way under the covering of the floor board. The present invention keeps grit and dirt from entering the opening around the switch by having the pressure-applying member for the dimmer switch overlie the opening. It is therefore an object of the present invention to provide a pressure-applying member that overlies the opening around the switch that alternately energizes the filaments in the headlights of automotive vehicles.

The dimmer switches in the various automotive vehicles do not project the same distances above the floor boards. As a result, operators of a make or model of vehicle that has a low switch tend to get in the habit of lifting the balls of their feet only a short distance; and they are constantly striking the sides of dimmer switches in makes or models of vehicles that have higher switches. This is not only irritating but it can cause confusion and loss of time; which loss of time may cause accidents. The present invention avoids such confusion and loss of time by providing a pressure-applying member that is of uniform height and can accommodate all sizes of switches used to alternately energize the filaments in the headlights of automotive vehicles.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purposes of illustration only and do not limit the invention and that the invention will be defined by the appended claims.

In the drawing—

Fig. 1 is a plan view of a portion of a pressure-applying member that is made in accordance with the principles and teachings of the present invention, Fig. 2 is a cross sectional, side elevational view of the pressure-applying member shown in Fig. 1, and it is taken along the plane indicated by the line 2—2 in Fig. 1.

Fig. 3 is a plan view of a spacer that can be used with the pressure-applying member of Figs. 1 and 2.

Fig. 4 is a cross sectional, side elevational view of the spacer shown in Fig. 3.

Figure 6:
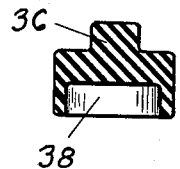
Figure 7:
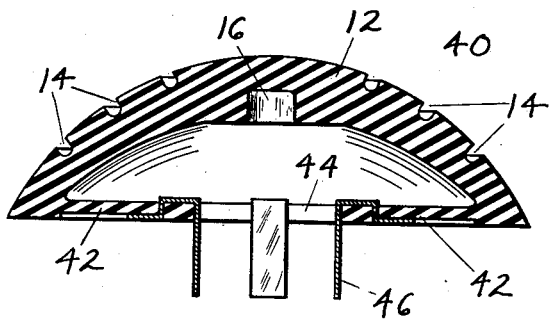

Fig. 5 is a cross sectional, side elevational view of the pressure-applying member of Figs. 1 and 2 and the spacer of Figs. 3 and 4 as they are assembled over a dimmer switch on the floor board of an automotive vehicle, Fig. 6 is a cross sectional, side elevational view of a spacer member that tends to maintain the pressure-applying member in position relative to the dimmer switch, Fig. 7 is a cross sectional, side elevational view of a modified form of pressure-applying member that is made in accordance with the principles and teachings of the present invention.

Figure 8:
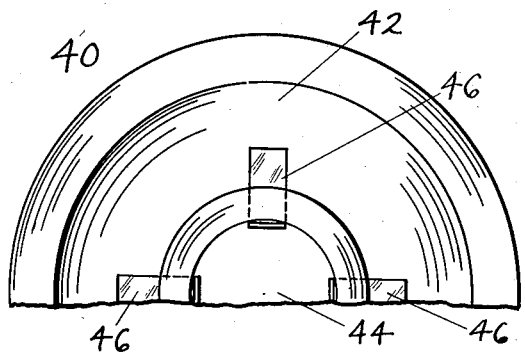
Figure 9:
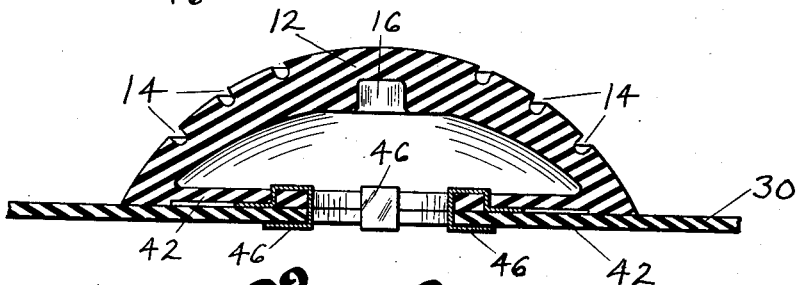

Fig. 8 is a bottom view of a portion of the pressure-applying member shown in Fig. 7, and Fig. 9 is a cross sectional, side elevational view of the pressure-applying member of Fig. 7 as that pressure-applying member is assembled with the covering for the floor board of an automotive vehicle.

Referring to the drawing in detail, the numeral 10 generally denotes a pressure-applying member provided by the present invention. That pressure-applying member has a large-diameter, convex pressing face 12 which is considerably larger than the upper end of the dimmer switch with which the pressure-applying member 10 is used. The large-diameter, convex pressing face 12 has three circular grooves 14 formed therein, and those grooves are concentric. Also concentric with the grooves 14 is a circular recess 16; and that recess is on the under side of the pressure-applying member 10. The central portion of the convex pressing face 12 is thicker than the outer portions of that face, and thus it does not flex as readily. Consequently, that central portion will resist deformation when pressed and will transmit the pressure to the upper end of the dimmer switch without appreciable diminution. The reduced thickness of, and the grooves 14 in, the outer portions of pressing face 12 permits vertical movement of the center portion of the face.

The numeral 18 denotes an annular bottom for the pressure-applying member 10; and that annular bottom is spaced vertically below the under surface of the pressing face 12 to form a cavity within the pressure-applying member 10. This cavity can receive the upper end of a switch that can alternately energize the filaments in the headlights of the vehicle. An opening 20 is provided in the center of the annular bottom 18 of the pressure-applying member 10, and that opening telescopes over the upper end of the switch which controls the filaments of the headlights. A flange 22 of annular form projects radially outwardly from the opening 20, and that flange is spaced downwardly below the bottom 18 of the pressure-applying member 10. As shown in Fig. 5, the flange 22 is intended to and does underlie the rubber mat 30 that is provided on the floor board 26 of the automotive vehicle.

Customarily, a felt or other pad 28 is provided between the rubber mat 30 and the floor board 26. In installing the pressure-applying member 10, it is only necessary to enlarge the opening which was originally formed in the rubber mat 30 to receive the upper end 34 of the dimmer switch 32. When this opening is made sufficiently large, the flange 22 of the pressure-applying member 10 can be compressed and slipped through that opening in the rubber mat 30. Thereafter, the flange 22 will straighten itself out and expand to a diameter larger than the diameter of the opening in the rubber mat 30, thus preventing separation of the pressure-applying member 10 from the rubber mat 30. The felt pad 28 also is preferably cut away, as shown in Fig. 5, to compensate for and receive the flange 22 of the pressure-applying member 10.

In those instances where the upper end 34 of the switch 32 projects approximately three quarters (¾) of an inch above the floor board of the vehicle, the upper end 34 of that switch will press directly against the under face of the pressing surface 12 of the pressure-applying member 10. Consequently a small movement downwardly of the pressing face 12 will cause downward movement of the upper end 34 of switch 32, and thus cause a change in the position of the contacts of that switch. In those instances where the upper end 34 of the switch 32 projects only one-half (½) inch above the floor board, it is desirable to provide a spacer 24. That spacer has a small-diameter projection which is approximately the same diameter as the recess 16 in the under surface of the pressing face 12 of the pressure-applying member 10. By inserting the projection of spacer 24 in the recess 16, the spacer 24 is held fixedly in position relative to the pressure-applying member 10 and thus is held in register with the upper end 34 of the switch 32. With this arrangement, pressure of the operator's foot on the pressing face 12 will cause prompt actuation of the switch 32. Where the upper member 34 of a switch projects above the floor board of the vehicle a distance greater than one-half (½) inch and less than three quarters (¾) of an inch, the overall height of the spacer 24 can be reduced to accommodate that upper member.

In this way, the pressure-applying member 10 can accommodate switches of three-quarter (¾) inch height, one-half (½) inch height, or any height in-between. Thus the pressure-applying member of the present invention is quite versatile and can accommodate practically all dimmer switches provided in automotive vehicles. This, despite the fact that the overall height of the pressure-applying member 10 is the same in each instance. By having the pressure-applying member of the present invention the same height in all cases, the drivers become accustomed to that height and are not confused when they shift from one make or model of vehicle to another.

It will be noted that the pressing face 12 of the pressure-applying member 10 has a diameter which is considerably larger than that of the small-diameter upper end 34 of the switch 32. Moreover, it will be noted that the pressure-applying member 10 has a three dimensional convex face that gives full support to the operator's foot no matter where that foot is placed on the pressure-applying member 10. In addition, because of the increased thickness of the center portion of the pressing face 12 of pressure-applying member 10, pressure of the operator's foot on any part of that center portion of that pressing face will cause movement of the upper member 34 of switch 32. Thus it is possible for the operator to quickly dim the headlights without groping. It is also possible for the operator to operate the switch repeatedly without any undue pressure on the ball of his foot; and it is possible for the operator to rest his foot comfortably on the pressure-applying member 10 and keep it there for prompt actuation of switch 32.

The flange 22 not only serves to prevent separation of the pressure-applying member 10 from the rubber mat 30 of the floor board 26, but it also tends to prevent shifting of the pressure-applying member 10 relative to the switch 32. Another way of securing the pressure-applying member 10 against shifting is to provide the spacer 36 of Fig. 6 for the pressure-applying member 10. The spacer 36 is provided with a recess 38 that fits over and snugly engages the upper portion 34 of the switch 32. The downwardly depending side walls of the spacer 36 will engage the sides of the upper member 34 of switch 32, and the projection on the top of spacer 36 will engage the recess 16 in the pressure-applying member 10, thus preventing shifting of the pressure-applying member 10. Where this is done, the flange 22 can be omitted from the pressure-applying member 10, and the annular bottom 18 of the pressure member 10 can be made flat.

Still another way of securing the bottom 18 of the pressure-applying member 10 to the rubber mat 30 would be to glue the bottom 18 of the member 10 to the floor mat by a rubber cement; and, of course, staples could be passed through the rubber mat 30 into the bottom 18 of the pressure-applying member 10 to secure the mat 30 and member 10 together. In each instance, the engagement between the pressure-applying member 10 and the spacer 36 or the mat 30 will hold the pressure-applying member in registry with the upper part 34 of the dimmer switch 32. If desired, the mat 30 and the pressure-applying member 10 could be moulded as a unit. In that case, the mat itself would hold the member 10 in juxtaposition to the dimmer switch.

In Figs. 7, 8, and 9, a modified form of pressure-applying member, provided by the present invention, is shown. That pressure-applying member is denoted generally by the numeral 40; and it is quite similar to pressure-applying member 10. The principal difference between the members 10 and 40 resides in the construction of the bottom of those members and the manner in which they are secured to the mat 30. The bottom of pressure-applying member 40 is annular in form, and it is denoted by the numeral 42. All portions of the bottom 42 do not lie in the same plane; instead, an intermediate portion of annular form is positioned a short distance above the rest of the bottom 42. Such positioning of the intermediate portion enables the bottom 40 to accommodate and hold the inner ends of metal clips 46. The inner ends of those clips extend through openings in the bottom 42 of the pressure-applying member 40 and underlie the intermediate portion of bottom 42. The outer ends of those clips extend to the openings 44 in the center of the bottom 42 and then pass downwardly in a direction parallel to the geometric axis of the pressure-applying member 40. These clips are flexible but are not resilient; and they can be bent under the mat 30, as shown in Fig. 9. With this arrangement, it is not necessary to enlarge the opening in the rubber mat 30 of the floor board; instead, it is only necessary to place the pressure-applying member 40 in telescoping arrangement with the upper section 34 of the switch 32, pass the outer ends of the clips 46 through the opening 44 in the mat 30, and then bend the clips 46 under the mat 30. This provides a simple and easy way of securing the pressure-applying member 40 to the floor mat 30. Obviously, the clips 46 could be molded in the bottom of the pressure-applying member 40 rather than made in the form of clips which are passed through openings in the bottom 42 of member 40.

The pressure-applying members 10 and 40 are preferably made of a resilient, flexible material. One such material is rubber, but synthetic rubber, neoprene, and other materials can be used. The grooves 14 of circular configuration assist in providing the necessary resilience and flexibility for the pressure-applying members 10 and 40, and they make it possible for those members to experience considerable bending. The resilience of the pressure-applying member is such that it will restore the pressure-applying members to the positions shown, and thus permit the springs of the dimmer switches to restore the upper members 34 of the switches 32 to normal position.

Whereas the drawing and accompanying description have shown and described preferred embodiments of the invention, it should be obvious to those skilled in the art that various changes can be made in the form and application of the invention without affecting the scope thereof.

What I claim is:

1. A pressure-applying member that is adapted to be disposed adjacent a switch which has a reciprocable actuator alternately reciprocable to change current flow through said switch and that comprises a bottom which is adapted to rest upon the covering for the surface adjacent said reciprocable actuator of said switch, a centrally-disposed opening in said bottom of said pressure-applying member that is dimensioned to telescope over said reciprocable actuator and to permit unimpeded movement of said reciprocable actuator of said switch, a flange on said bottom of said pressure-applying member that is adjacent said opening in said bottom and that is dimensioned to extend through that opening in said covering which surrounds said reciprocable actuator of said switch, said flange being adapted to underlie said covering and to hold said pressure-applying member in assembled relation with said covering, a convex pressing surface on said pressure-applying member that is secured at its periphery to the periphery of said bottom, said pressing surface extending upwardly from said bottom of said pressure-applying member to confine and overlie said reciprocable actuator of said switch, said convex pressing surface being so dimensioned and disposed relative to said reciprocable actuator of said switch that the portion of said pressing surface which is most distant from said covering is in register with and overlies said reciprocable actuator of said switch, said convex pressing surface of said pressure-applying member having a section of increased thickness adjacent said most distant portion of said pressing surface, said section of increased thickness being stiff and being adapted to overlie and extend beyond the periphery of said reciprocable actuator of said switch to provide a pressure-applying area which is larger than the area of said reciprocable actuator, the section of said pressing surface between the periphery of said pressing surface and the section of increased thickness being readily flexible to permit movement of said section of increased thickness and said reciprocable actuator toward said surface adjacent said switch, and a concentric groove in said pressing surface between the periphery of said pressing surface and said section of increased thickness to enhance the flexibility of said pressing surface.

2. A pressure-applying member that is adapted to be disposed adjacent a switch which has a reciprocable actuator alternately reciprocable to change current flow through said switch and that comprises a bottom which is adapted to rest upon the covering for the surface adjacent said reciprocable actuator of said switch, a centrally-disposed opening in said bottom of said pressure-applying member that is dimensioned to telescope over said reciprocable actuator of said switch and to permit unimpeded movement of said reciprocable actuator of said switch, a convex pressing surface on said pressure-applying member that is secured at its periphery to the periphery of said bottom, said pressing surface extending upwardly from said bottom of said pressure-applying member to confine and overlie said reciprocable actuator of said switch, said convex pressing surface being so dimensioned and disposed relative to said reciprocable actuator of said switch that the portion of said pressing surface which is most distant from said covering is in register with and overlies said reciprocable actuator of said switch, said convex pressing surface of said pressure-applying member having a section of increased thickness adjacent said most distant portion of said pressing surface, said section of increased thickness being stiff and being adapted to overlie and extend beyond the periphery of said reciprocable actuator of said switch to provide a pressure-applying area which is larger than the area of said reciprocable actuator, the section of said pressing face between the periphery of said pressing face and the section of increased thickness being readily flexible to permit movement of said section of increased thickness and said reciprocable actuator toward said surface adjacent said switch, and a concentric groove in said pressing surface between the periphery of said pressing surface and said section of increased thickness to enhance the flexibility of said pressing surface.

3. A pressure-applying member that is adapted to be disposed adjacent a switch which has a reciprocable actuator alternately reciprocable to change current flow through said switch and that comprises a bottom which is adapted to rest upon the surface adjacent said reciprocable actuator of said switch, an opening in said bottom of said pressure-applying member that is dimensioned to telescope over said reciprocable actuator of said switch and to permit unimpeded movement of said reciprocable actuator of said switch, a securing element that is adapted to engage said pressure-applying element and said surface adjacent said reciprocable actuator of said switch to maintain said pressure-applying member in assembled relation with said surface adjacent said reciprocable actuator of said switch, a convex pressing surface on said pressure-applying member that is disposed above said bottom and overlies said reciprocable actuator of said switch, said convex pressing surface being so dimensioned and disposed relative to said reciprocable actuator of said switch that the portion of said pressing surface which is most distant from said surface adjacent the reciprocable actuator of said switch is in register with and overlies said reciprocable actuator of said switch, said convex pressing surface of said pressure-applying member having a section of increased thickness adjacent said most distant portion of said pressing surface, said section of increased thickness being stiff and being adapted to overlie and extend beyond the periphery of said reciprocable actuator of said switch to provide a pressure-applying area which is larger than the area of said reciprocable actuator, the rest of said pressing surface being flexible to permit movement of said section of increased thickness and said reciprocable actuator toward said surface adjacent said reciprocable actuator of said switch, and a groove in said pressing surface to enhance the flexibility of said pressing surface.

4. A pressure-applying member that is adapted to be disposed adjacent a switch which has a reciprocable actuator alternately reciprocable to change current flow through said switch and that comprises a bottom which is adapted to rest upon the surface adjacent said reciprocable actuator of said switch, an opening in said bottom of said pressure-applying member that is dimensioned to telescope over said reciprocable actuator of said switch and to permit unimpeded movement of said reciprocable actuator of said switch, a securing element that is adapted to hold said pressure-applying member adjacent said reciprocable actuator of said switch, a convex pressing surface on said pressure-applying member that is disposed above said bottom and overlies said reciprocable actuator of said switch, said convex pressing surface being so dimensioned and disposed relative to said reciprocable actuator of said switch that the portion of said pressing surface which is most distant from said surface adjacent said reciprocable actuator of said switch is in register with and overlies said reciprocable actuator of said switch, said convex pressing surface of said pressure-applying member having a section of increased thickness adjacent said most distant portion of said pressing surface, said section of increased thickness being stiff and being adapted to overlie and extend beyond the periphery of said reciprocable actuator of said switch, and a groove in said pressing surface to enhance the flexibility of said pressing surface.

5. A pressure-applying member that is adapted to be disposed adjacent a switch which has a reciprocable actuator alternately reciprocable to change current flow through said switch and that comprises a securing element that is adapted to secure said pressure-applying element to a surface adjacent the reciprocable actuator of said switch, a convex pressing surface on said pressure-applying member that is adapted to overlie said reciprocable actuator of said switch, said convex pressing surface being so dimensioned and disposed relative to said reciprocable actuator of said switch that the portion of said pressing surface which is most distant from said surface adjacent said reciprocable actuator of said switch is in register with and overlies said reciprocable actuator of said switch, said convex pressing surface of said pressure-applying member having a section of increased thickness adjacent said most distant portion of said pressing surface, said section of increased thickness being stiff and being adapted to overlie and extend beyond the periphery of said reciprocable actuator of said switch to provide a pressure-applying area which is larger than the area of said reciprocable actuator, and a groove in said pressing surface to enhance the flexibility of said pressing surface.

6. A pressure-applying member that is adapted to be disposed adjacent a switch which has a reciprocable actuator alternately reciprocable to change current flow through said switch and that comprises a securing element that is adapted to secure said pressure-applying element to a surface adjacent the reciprocable actuator of said switch, a convex pressing surface on said pressure-applying member that is adapted to overlie said reciprocable actuator of said switch, said convex pressing surface being so dimensioned and disposed relative to said reciprocable actuator of said switch that the portion of said pressing surface which is most distant from said surface adjacent said reciprocable actuator of said switch is in register with and overlies said reciprocable actuator of said switch, said convex pressing surface of said pressure-applying member having a section of increased thickness adjacent said most distant portion of said pressing surface, said section of increased thickness being stiff and being adapted to overlie and extend beyond the periphery of said reciprocable actuator of said switch to provide a pressure-applying area which is larger than the area of said reciprocable actuator.

7. A pressure-applying member that is adapted to be disposed adjacent a switch which has a reciprocable actuator alternately reciprocable to change current flow through said switch and that comprises a securing element that is adapted to hold said pressure-applying member adjacent said reciprocable actuator of said switch, and a pressing surface on said pressure-applying member that is adapted to overlie said reciprocable actuator of said switch, said pressing surface being so dimensioned and disposed relative to said reciprocable actuator of said switch that the portion of said pressing surface which is most distant from said surface adjacent the reciprocable actuator of said switch is in register with and overlies said reciprocable actuator of said switch, said pressing surface having a section of increased stiffness adjacent said most distant portions of said pressing surface, said section of increased stiffness being adapted to overlie and extend beyond the periphery of said reciprocable actuator of said switch to provide a pressure-applying area which is larger than the area of said reciprocable actuator, and a spaced that is removably disposable between said reciprocable actuator of said switch and said section of increased stiffness of said pressing surface of said pressure-applying member.

8. A pressure-applying member that is adapted to be disposed adjacent the switch which has a reciprocable actuator alternately reciprocable to change current flow through said switch and that comprises a pressing surface on said pressure-applying member which is adapted to overlie said reciprocable actuator of said switch, said pressing surface being so dimensioned and disposed relative to the surface adjacent the reciprocable actuator of said switch that the portion of said pressing surface which is most distant from said surface adjacent the reciprocable actuator of said switch is in register with and overlies said reciprocable actuator of said switch, said pressing surface of said pressure-applying member having a section of increased stiffness adjacent said most distant portion of said pressing surface, said section of increased stiffness being adapted to overlie and extend beyond the periphery of said reciprocable actuator of said switch to provide a pressure-applying area which is larger than the area of said reciprocable actuator, and a spacer that is removably disposed between said reciprocable actuator of said switch and said section of increased stiffness of said pressing surface, said spacer having a recess therein which is adapted to receive the upper end of said reciprocable actuator of said switch and thereby maintain said pressure-applying member in assembled relation with said reciprocable actuator of said switch.

9. A pressure-applying member that is adapted to be disposed adjacent a switch which has a reciprocable actuator alternately reciprocable to change current flow through said switch and that comprises a securing element that is adapted to hold said pressure-applying member adjacent said reciprocable actuator of said switch, and a pressing surface on said pressure-applying member that is adapted to overlie said reciprocable actuator of said switch, said pressing surface being so dimensioned and disposed relative to said reciprocable actuator of said switch that the portion of said pressing surface which is most distant from said surface adjacent the reciprocable actuator of said switch is in register with and overlies said reciprocable actuator of said switch, said pressing surface having a section of increased stiffness adjacent said most distant portions of said pressing surface, said section of increased stiffness being adapted to overlie and extend beyond the periphery of said reciprocable actuator of said switch to provide a pressure-applying area which is larger than the area of said reciprocable actuator, said securing element being a foldable clip which can be folded to hold said pressure-applying member against movement.

EUGENE J. KARSCH.

REFERENCES CITED

The following references are of record in the file of this patent:

UNITED STATES PATENTS

| Number | Name | Date |
|---|---|---|
| 450,292 | Johnston | Apr. 14, 1891 |
| 2,343,060 | Horning | Feb. 29, 1944 |
| 2,382,738 | Moyses | Aug. 14, 1945 |
| 2,394,271 | Taylor | Feb. 5, 1946 |
| 2,436,958 | Eisenberg | Mar. 2, 1948 |
| 2,475,404 | Reed | July 5, 1949 |

FOREIGN PATENTS

| Number | Country | Date |
|---|---|---|
| 225,391 | Great Britain | Dec. 4, 1924 |